June 23, 1942.  J. B. DICKSON ET AL  2,287,605
INDICATING DEVICE
Filed May 28, 1941   2 Sheets-Sheet 1
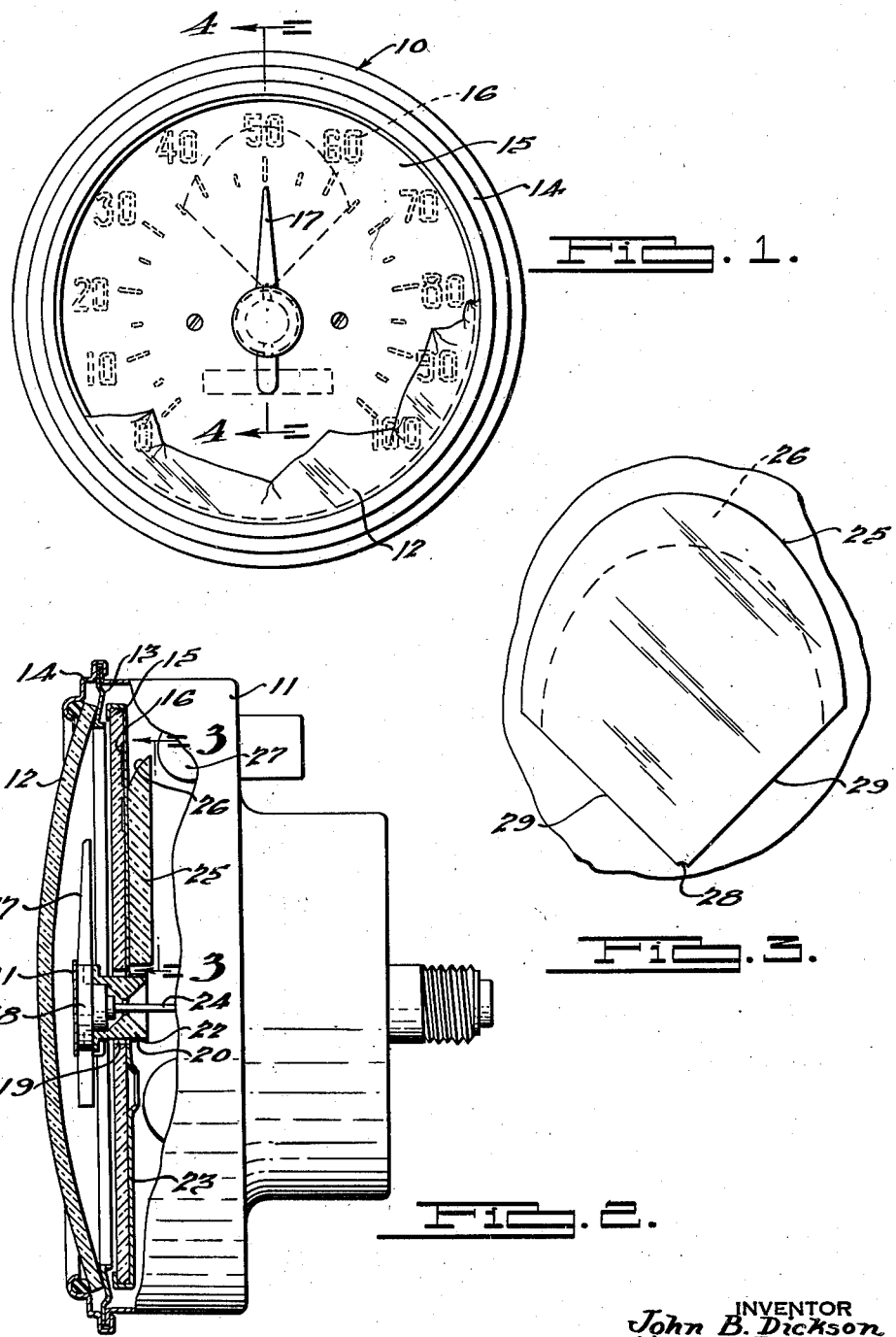
INVENTOR
*John B. Dickson*
*Henry R. Voorhees*
BY
*Harness, Lind, Patee & Harris*
ATTORNEYS

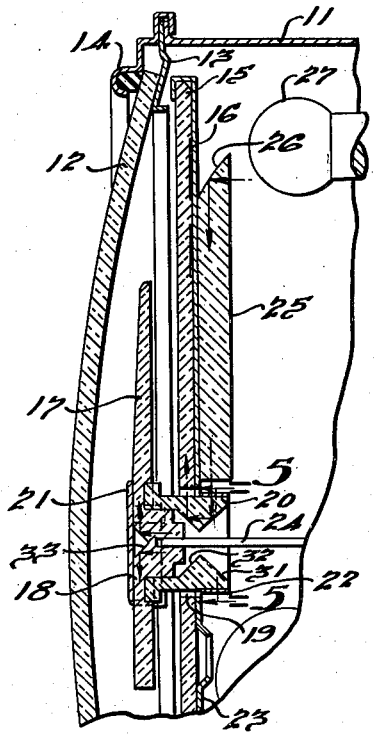
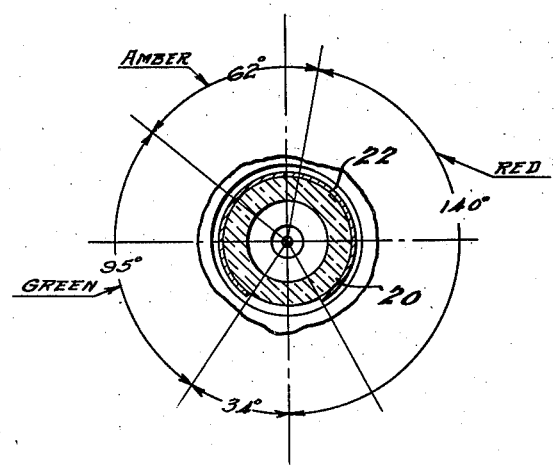
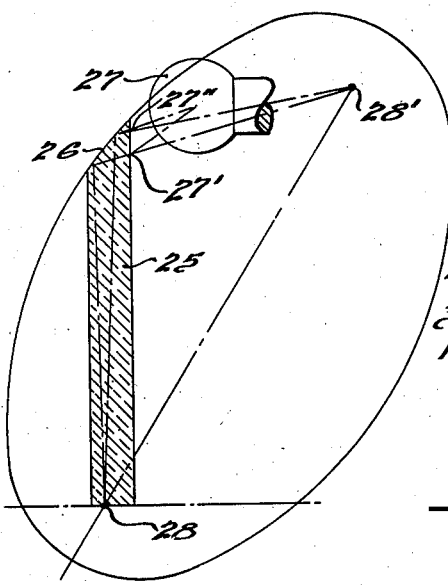
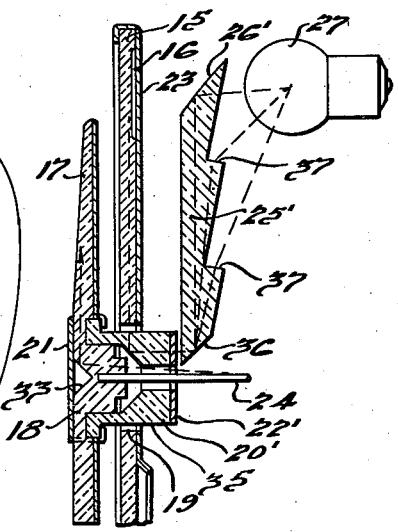

Patented June 23, 1942

2,287,605

UNITED STATES PATENT OFFICE 2,287,605

INDICATING DEVICE

John B. Dickson and Henry R. Voorhees, Detroit, Mich., assignors to Chrysler Corporation, Highland Park, Mich., a corporation of Delaware Application May 28, 1941, Serial No. 395,606

12 Claims. (Cl. 116—129)

This invention relates to an indicating device, and more particularly to an illuminated device including fixed configuration and a relatively movable indicator.

An object of the invention is to provide improved illumination for a device of the foregoing type and more particularly to effect edge illumination thereof.

Another object of the invention is to provide in an indicating device including relatively movable configuration and an indicator, of improved means for effecting illumination of the configuration in a plurality of colors, the particular color of illumination being determined by the relative position of the indicator and configuration.

More particularly, an object of the invention is to so illuminate a speed indicating device including a stationary dial and a movable indicator as to change the color of dial illumination as the position of the indicator changes with respect to the dial, thereby indicating the speed of the vehicle in certain ranges by the particular colored illumination of the dial.

A further object of the invention is to provide in an illuminated indicated device a transparent optical member which will intercept rays of light at a relatively removed location and concentrate the same at a point relatively removed from the source of light, and more particularly to provide an optical member having a light reflecting surface constituting a portion of an elliptical surface of revolution, the source of light being disposed with respect to said surface as to create a vertical focus at the primary focus of the surface of revolution of which said portion is a part and the secondary focus being disposed adjacent a light receiving surface; and to provide in an indicating device an optical member having a light reflecting surface as aforesaid, a second light reflecting surface at the secondary focus and a light refracting surface intermediate said reflecting surfaces.

A still further object of the invention is to provide an indicating device including an illuminated configuration and a movable illuminated indicator wherein the color of configuration illumination changes in response to relative change in position of the indicator with respect to the configuration and wherein the color of indicator illumination changes with the color of the configuration illumination.

Other objects of the invention will be more apparent from the following description taken in connection with the accompanying drawings in which:

Fig. 1 is a front elevational view of an indicating device embodying the invention, parts being broken away to show the underlying structure.

Fig. 2 is a side elevational view of the device shown in Fig. 1, parts being broken away and in section.

Fig. 3 is an elevational view of the light collimating member taken as indicated by the line 3—3 of Fig. 2.

Fig. 4 is an enlarged fragmentary sectional view taken as indicated by the line 4—4 of Fig. 1.

Fig. 5 is a sectional view taken on line 5—5 of Fig. 4 illustrating more particularly the range of the various colors for the coloring band.

Fig. 6 is a view diagrammatically illustrating an elliptical surface of revolution of which the reflecting surface of the light collecting and concentrating member constitutes a part and the relative positions of the source of light and the point of concentration thereof by the light reflecting surface.

Fig. 7 is a sectional elevational view somewhat similar to Fig. 4 but illustrating a modified form of the invention.

The invention is illustrated and described in connection with a speed indicating device for a motor vehicle although it will be understood that the same can be employed in other indicating devices and the invention is not limited in its broad aspects to the particular type of device chosen for illustration.

The device, generally indicated by the numeral 10, includes a casing 11 adapted to be fixed with respect to a support, such as a vehicle instrument panel. The front face of the casing is closed by a transparent cover 12 retained in position by bezel members 13 and 14. The device includes a dial 15 having indicia or configuration 16 comprising spaced marks and numerals recessed in the back face of the dial, the latter preferably being a transparent glass or plastic member with the recesses filled with a light-reflecting substance, such as an opaque enamel paint, for example, so that the configuration is visible through the clear cover 12 and the clear dial 15.

Associated with the dial is a movable pointer 17 having a hub 18, each of which is preferably formed of clear glass or plastic. The pointer is preferably backed by a layer of paint or other material in order that it will glow when lighted as hereinafter set out. The dial 15 has an opening therein having an edge portion 19, an annular member 20 preferably of clear glass or plastic extending through the opening in the dial 15 in radially spaced relation to the edge 20 and telescoping the pointer hub 18 and secured thereto by the part 21. Extending about the outer periphery of the annular member 20 is a translucent band 22, portions of which are respectively colored green, amber and red, as indicated by the legend in Fig. 5. A backing member 23 is provided which has an opening accommodating the member 20, a pointer shaft 24 passing through a central aperture of the latter member.

Positioned rearwardly of the dial 15 and abutting the backing 23 is an optical member 25 preferably formed of clear glass or clear plastic adapted to intercept light from a source and concentrate the same at a point immediately adjacent the color band 22. For this purpose the member 25 has a light reflecting surface 26 which, as illustrated more particularly in Fig. 6, constitutes a portion of an elliptical surface of revolution. The member 25 and the light source 27 are arranged in such relationship that internal reflection will occur from surface 26. The light source is disposed near the member 25 in order to supply light to the surface 26 and in such position that refraction of light will occur at points 27' and 27'' in such a manner that a virtual focus 28' is created, the latter point being the primary focus of the ellipse of which the surface 26 is a surface of revolution, and light thus reflected by the surface 26 will be directed to the secondary focus of said ellipse as indicated at 28. In order to minimize dispersion of light rays thus directed by the surface 26, the member 25 has angularly disposed edges 29 which converge at the secondary focus indicated at 28.

In operation of the device, light is reflected by the surface, in a radial path with respect to the axis of rotation of the annular member 20, to the point 28 from whence it passes through the band 22 to the member 20. The latter is provided with light reflecting surfaces 31 and 32 converging toward the rod 24 and light so received by the member 20 through the band 22 is reflected axially with respect to the member 20 by the surface 31 and then radially by the surface 32 to the edge 19 of the dial 15 to effect edge illumination of the configuration. This path of light is indicated by the arrows in Fig. 4. Certain of the light rays entering the member 20 will stray from the path indicated and be received by the transparent hub 18 and directed by the reflecting surface 33 to the pointer 17 for edge illumination thereof.

As heretofore pointed out, the pointer 17, hub 18, member 20 and band 22 rotate together. As the vehicle moves from an at rest position, the pointer rotates in a clockwise direction as viewed in Fig. 1, from a position at the naught of the configuration and the member 20 is rotated therewith. The portion of the band 22 colored green will thus be brought into registration with the point 28, with the result that light reflected to the pointer and dial as aforesaid will be colored green. This condition will continue until the pointer passes the numeral 30 for example, whereupon the portion of the band colored amber will be brought into registration with the point 28 and the pointer and dial will be colored amber. When the pointer advances to a position slightly beyond the numeral 50 the portion of the band colored red will be brought into registration with the point 28 and the pointer and dial will be correspondingly colored.

It will be understood that the three foregoing ranges represent ranges of vehicle speed so that during operation of the vehicle between zero and 30 miles per hour the pointer and dial are colored green, between 30 and 50 miles per hour the coloring is amber, and therebeyond the coloring is red. Such ranges can be varied, both in speedometers and other types of indicating devices, from that shown herein.

Referring to Fig. 7, the annular member 20' has the color band 22' secured to the end face thereof spaced from the pointer hub 18, and is provided with an annular light reflecting surface 35 so that light received through the band 22' is directed radially outwardly to the edge 19 of the dial. The light collecting and concentrating member 25' differs from that shown in Figs. 1 to 6 in that on its rear face it is provided with a light reflecting surface 36 by which light directed thereto by the surface 26' is reflected axially with respect to the member 20' to pass through the color band 22' to the latter. The rear face of the member 25' is provided with surfaces of light entrances 37 which are so disposed angularly with respect to certain of the rays of light from the source 27 that they are directed by refraction to the surface 36. Otherwise operation is the same as that set forth above.

Although but several embodiments of the invention are herein shown and described, it will be understood that various changes in the size, shape and arrangement of parts may be made without departing from the spirit of my invention and it is not my intention to limit said invention other than by the terms of the appended claims.

We claim:

1. In an indicating device, an illuminable transparent element having a configuration associated therewith, a transparent element for receiving light and reflecting the same to edge illuminate the first mentioned element, and light focusing member disposed in light transmitting relationship between a source of light and the second mentioned element and having a light receiving end adjacent said source including a light reflecting surface constituting a portion of an elliptical surface of revolution and an outlet end adjacent the second mentioned element for emitting light upon the latter, said outlet end being located substantially at a focus of the ellipse of which said surface portion is a surface of revolution.

2. In an indicating device, an illuminable transparent element having a configuration associated therewith, a transparent element for receiving light and reflecting the same to edge illuminate the first mentioned element, light focusing member disposed in light transmitting relationship between a source of light and the second mentioned element and having a light receiving end adjacent said source including a light reflecting surface constituting a portion of an elliptical surface of revolution, an outlet end adjacent the second mentioned element for emitting light upon the latter, said outlet end being located substantially at a focus of the ellipse of which said surface portion is a surface of revolution, and transparent light coloring means disposed between the second mentioned element and said outlet end.

3. In an indicating device, a dial having a configuration associated therewith, a transparent element for receiving light and reflecting the same to illuminate said configuration by internal reflection within said dial, a transparent indicating member movable relative to said dial and configuration and disposed in light receiving relation with respect to said element, and a light focusing member disposed in light transmitting relationship between a source of light and the second mentioned element and including a light reflecting surface constituting a portion of an elliptical surface of revolution disposed in light receiving relation with respect to said source of light for receiving light rays therefrom and focusing the same at a light emitting end adjacent said element.

4. In an indicating device, a dial having a configuration associated therewith, a transparent element for receiving light and reflecting the same to illuminate said configuration by internal reflection within said dial, a transparent indicating member movable relative to said dial and configuration and disposed in light receiving relation with respect to said element, a light focusing member disposed in light transmitting relationship between a source of light and the second mentioned element and including a light reflecting surface constituting a portion of an elliptical surface of revolution disposed in light receiving relation with respect to said source of light for receiving light rays therefrom and focusing the same at a light emitting end adjacent said element, and light coloring means movable with said pointer interposed in the path of light between said focusing member and said element.

5. In an indicating device, an illuminable transparent element having a configuration associated therewith and a light receiving edge, a transparent element for receiving and directing light rays to said edge to edge illuminate the first mentioned element, and light receiving and directing collimating means disposed in light transmitting relationship between a source of light and the second mentioned element and including a member having a light reflecting surface constituting a portion of an elliptical surface of revolution disposed in light receiving relation with respect to said source and having oppositely disposed face portions converging to form an outlet end disposed immediately adjacent said second mentioned element.

6. In an indicating device, a transparent illuminable configuration bearing element having a light receiving edge, a second element movably associated with the first mentioned element and having an illuminable pointer in juxtaposition to the configurations of the first mentioned element, a transparent light receiving and directing element movable with said second element and said pointer in juxtaposition to said light receiving edge, transparent light coloring means movable with said light receiving and directing element, and a transparent optical member having a light reflecting surface constituting a portion of an elliptical surface of revolution disposed in light receiving relation with respect to said source and having an outlet disposed adjacent the second mentioned element for emitting light upon the latter, said outlet end being located substantially at a focus of the ellipse of which said surface portion is a surface of revolution.

7. In an indicating device, an illuminable transparent dial having a light receiving edge, a transparent element having light receiving and reflecting surfaces to edge illuminate the dial, and a transparent optical member for concentrating light at said light receiving face, said member having a light reflecting surface disposed adjacent said light receiving face, a light reflecting surface constituting a portion of an elliptical surface of revolution spaced from the last mentioned surface, and a light refracting surface disposed intermediate the said light reflecting surfaces of said member, the second mentioned reflecting surface and said light refracting surface being disposed in light receiving relation with respect to a source of light and the first mentioned light reflecting surface being disposed substantially at a focus of the ellipse of which the said second mentioned surface is a surface of revolution.

8. In an indicating device, an illuminable transparent dial having a light receiving edge, a transparent element having light receiving and reflecting surfaces to edge illuminate the dial, a transparent optical member for concentrating light at said light receiving face, said member having a light reflecting surface disposed adjacent said light receiving face, a light reflecting surface constituting a portion of an elliptical surface of revolution spaced from the last mentioned surface, a light refracting surface disposed intermediate the said light reflecting surfaces of said member, and transparent light coloring means disposed between the light receiving surface of said element and the first mentioned light reflecting surface of said member, the second mentioned reflecting surface and said light refracting surface being disposed in light receiving relation with respect to a source of light and the first mentioned light reflecting surface being disposed substantially at a focus of the ellipse of which the said second mentioned surface is a surface of revolution.

9. In an indicating device, an illuminable transparent element having configuration associated therewith, a rotatable pointer in juxtaposition to the configuration of the first mentioned element, a transparent element rotatable with said pointer having light receiving and reflecting surfaces, a stationary transparent optical member having a light receiving peripheral surface so constructed and arranged as to intercept light throughout a given band and to concentrate the same by internal reflection thereof in a direction radially with respect to the axis of rotation of the second mentioned element to an outlet point adjacent the light receiving face of the latter, and light coloring means rotatable with said second mentioned element interposed between the light receiving face of the latter and said outlet point of optical member.

10. In an indicating device, an illuminable transparent element having configuration associated therewith, a rotatable pointer in juxtaposition to the configuration of the first mentioned element, a transparent element rotatable with said pointer having light receiving and reflecting surfaces, a stationary transparent optical member having a light receiving surface so constructed and arranged as to intercept light throughout a given band and to concentrate the same by refraction thereof in a direction radially with respect to the axis of rotation of the second mentioned element to an outlet point adjacent the light receiving face of the latter, and light coloring means rotatable with said second mentioned element interposed between the light receiving face of the latter and said outlet point of said optical member.

11. In an indicating device, an illuminable transparent element having a light receiving edge, a transparent light focusing member disposed adjacent said element including a light reflecting surface constituting a portion of an elliptical surface of revolution and so disposed with respect to a source of light that rays received therefrom are reflected internally of said member and focused at a light outlet adjacent a focus of the ellipse of which said surface is a surface of revolution, and means adjacent the region of said outlet for receiving and directing light rays to the light receiving edge of said illuminable element.

12. In an indicating device, an illuminable dial having a light receiving edge, a movable indicator associated with the dial, a transparent light focusing member disposed adjacent said element including a light reflecting surface constituting a portion of an elliptical surface of revolution and so disposed with respect to a source of light that rays received therefrom are reflected internally of said member and focused at a light outlet therein adjacent a focus of the ellipse of which said surface is a surface of revolution, means adjacent the region of said outlet end for receiving and directing light rays to the light receiving edge of said dial, and light coloring means operatively interposed between said outlet and said light receiving and directing means and including portions of respectively different colors movable with said indicator.

JOHN B. DICKSON.
HENRY R. VOORHEES.